(12) United States Patent
Kodama

(10) Patent No.: US 12,317,789 B2
(45) Date of Patent: Jun. 3, 2025

(54) TRIMMING MACHINE

(71) Applicant: YAMABIKO CORPORATION, Ohme (JP)

(72) Inventor: Hisao Kodama, Ohme (JP)

(73) Assignee: Yamabiko Corporation, Tokyo (JP)

( * ) Notice: Subject to any disclaimer, the term of this patent is extended or adjusted under 35 U.S.C. 154(b) by 427 days.

(21) Appl. No.: 17/866,750

(22) Filed: Jul. 18, 2022

(65) Prior Publication Data

US 2023/0014201 A1 Jan. 19, 2023

(30) Foreign Application Priority Data

Jul. 19, 2021 (JP) ................................ 2021-118520

(51) Int. Cl.
*A01G 3/053* (2006.01)
*A01G 3/04* (2006.01)
*F16H 21/22* (2006.01)

(52) U.S. Cl.
CPC ...... *A01G 3/053* (2013.01); *A01G 2003/0461* (2013.01); *F16H 21/22* (2013.01)

(58) Field of Classification Search
CPC .... A01G 2003/0461; A01G 3/04; F16H 21/22
USPC .................................................. 30/208, 165
See application file for complete search history.

(56) References Cited

U.S. PATENT DOCUMENTS

| 3,193,925 A | * | 7/1965 | Hawley | A01G 3/053 30/223 |
| 3,422,531 A | * | 1/1969 | Lill | A01G 3/053 30/221 |
| 3,902,243 A | * | 9/1975 | Klebe, Jr. | A01G 3/053 30/220 |
| 5,153,996 A | * | 10/1992 | Kuzarov | A01G 3/053 30/223 |

(Continued)

FOREIGN PATENT DOCUMENTS

| CN | 110810045 A | 2/2020 |
| CN | 213306379 U | * 6/2021 |

(Continued)

OTHER PUBLICATIONS

WO 2017092781 A1, Hansson et al. (Year: 2017).*

(Continued)

*Primary Examiner* — Adam J Eiseman
*Assistant Examiner* — Deborah Lin
(74) *Attorney, Agent, or Firm* — Crowell & Moring LLP

(57) ABSTRACT

A trimming machine capable of suppressing damage to a gear when blades are locked, with a simple structure without increasing weight and cost. The trimming machine includes: an electric motor; a blade drive gear rotationally driven by the electric motor; an eccentric cam provided in the gear; and a pair of blades relatively slidably facing and contacting each other, in which the eccentric cam is adapted to reciprocate the pair of blades in relatively opposite directions along the longitudinal direction of the blades, thereby grind- (Continued)

ing cutting edges against each other, the cutting edges provided in a protruding manner with gaps therebetween in the pair of blades, and a shock absorbing portion is provided between a connecting portion connected to the eccentric cam and the cutting edges in each of the blades.

6 Claims, 6 Drawing Sheets

(56) References Cited

U.S. PATENT DOCUMENTS

| | | | |
|---|---|---|---|
| 5,862,598 A * | 1/1999 | Lee | A01D 34/4168 |
| | | | 30/276 |
| 6,263,579 B1 | 7/2001 | Nagashima | |
| 2015/0223401 A1 | 8/2015 | Schiedt | |
| 2019/0338839 A1 * | 11/2019 | Hanada | A01G 3/053 |

FOREIGN PATENT DOCUMENTS

| | | |
|---|---|---|
| JP | 11-9089 A | 1/1999 |
| JP | 2015-512619 A | 4/2015 |
| JP | 2019-193598 A | 11/2019 |
| WO | WO-2017092781 A1 * | 6/2017 ............. A01G 3/053 |

OTHER PUBLICATIONS

CN213306379U English Machine Translated (Year: 2021).*
Extended European Search Report in Europe Application No. 22185140.5, dated Dec. 7, 2022, 4 pages.
Office Action in Japan Application No. 2021-118520, dated Apr. 15, 2025, 3 pages.

* cited by examiner

TRIMMING MACHINE

RELATED APPLICATIONS

This application claims priority to Japanese Patent Application No. 2021-118520, filed on Jul. 19, 2021, the entire content of which is incorporated herein by reference.

BACKGROUND OF THE INVENTION

1. Field of the Invention

The present invention relates to a trimming machine.

2. Description of the Related Art

A trimming machine, such as a hedge trimmer and a clipper used for trimming or cropping hedges or plants, includes a blade drive gear rotationally driven by a drive source in a body case, a cam (eccentric cam) including upper and lower eccentric disks that are each provided on one face side of the gear, and a pair of upper and lower blades mutually slidably facing and contacting each other, and is configured to perform trimming or cropping by causing the eccentric cam to reciprocate the elongated upper and lower blades in mutually (relatively) opposite directions along the longitudinal direction of the blades, thereby grinding their cutting edges in a comb-like tooth shape against each other (see, for example, JP 2019-193598 A).

There are some conventional trimming machines in which a main shaft is rotatably and axially supported on a transmission case of a body case (working machine main body) and is driven through a centrifugal clutch by a crank shaft of an internal combustion engine as a drive source so as to reciprocate upper and lower blades (see, for example, JP H11-009089 A).

SUMMARY OF THE INVENTION

In a trimming machine adopting the aforementioned clutch mechanism, when the cutting edges are caught in a solid material made of a wide branch, a fence, steel or the like while performing trimming or cropping, causing the blades to be locked, since the clutch mechanism slides to release the rotating force of the engine or the shock (large torque) at the time of locking, the shock at the time of locking or the like is less likely to be directly transmitted to the gear, thereby suppressing damage to the gear.

Meanwhile, in a trimming machine electrically driven by an electric motor (hereinafter simply referred to as a motor in some cases) as a drive source, when locking occurs while performing trimming or cropping without adopting the clutch mechanism, the rotating force of the motor or the shock (large torque) at the time of locking cannot be released by means of the clutch mechanism, which could damage (tooth lacking or the like) the gear due to the direct transmission of the shock at the time of locking or the like.

As a measure to address the foregoing, for example, adoption of the clutch mechanism as in the engine-driven machines may be considered. However, such a measure could cause problems in that heavier load is put on the user due to degraded operability as a result of weight increase, and cost increases.

The present invention has been made in view of the foregoing and provides a trimming machine capable of suppressing damage to a gear when blades are locked, with a simple structure without increasing weight and cost.

To provide solution to the foregoing, the trimming machine according to the present invention basically includes: an electric motor; a blade drive gear rotationally driven by the electric motor; an eccentric cam provided in the gear; and a pair of blades relatively slidably facing and contacting each other, in which the eccentric cam is adapted to reciprocate the pair of blades in relatively opposite directions along a longitudinal direction of the blades, thereby grinding cutting edges against each other, the cutting edges provided in a protruding manner with gaps therebetween in the pair of blades, and a shock absorbing portion is provided between a connecting portion connected to the eccentric cam and the cutting edges in each of the blades.

In a preferred aspect, the trimming machine may include a connecting rod that connects the eccentric cam and each of the blades, and the shock absorbing portion may be provided between a connecting portion connected to the connecting rod and the cutting edges in each of the blades.

In another preferred aspect, the shock absorbing portion may include a fragile portion.

In yet another preferred aspect, the shock absorbing portion may include a slit portion extending in an orthogonal direction relative to a reciprocating direction of the blades.

In further another preferred aspect, the width in the orthogonal direction of the shock absorbing portion including the slit portion may be wider than the width in the orthogonal direction of each of the blades between the connecting portion and the shock absorbing portion and/or may be wider than the width in the orthogonal direction of each of the blades between the shock absorbing portion and the cutting edges.

In another preferred aspect, the width in the orthogonal direction of the shock absorbing portion including the slit portion may be narrower than the width in the orthogonal direction of the cutting edges provided in a protruding manner in each of the blades.

In yet another preferred aspect, the slit portion may be provided with a fragile portion.

In further another preferred aspect, the fragile portion may include at least one of a notch, a cutout, a recess, or a groove.

In yet another preferred aspect, the slit portion may extend, in the orthogonal direction relative to the reciprocating direction of the blades, from an elongated aperture into which a member that retains the pair of blades reciprocatively in relatively opposite directions along the longitudinal direction of the blades is inserted.

In further another preferred aspect, the slit portion may extend, in the orthogonal direction relative to the reciprocating direction of the blades, from a position different from the elongated aperture into which the member that retains the pair of blades reciprocatively in relatively opposite directions along the longitudinal direction of the blades is inserted.

According to the present invention, since a shock absorbing portion only needs to be provided between the connecting portion and the cutting edges in the blades, damage to the gear can be suppressed when the blades are locked, with a simple structure without increasing weight and cost.

DETAILED DESCRIPTION OF THE PREFERRED EMBODIMENTS

Figure 1:
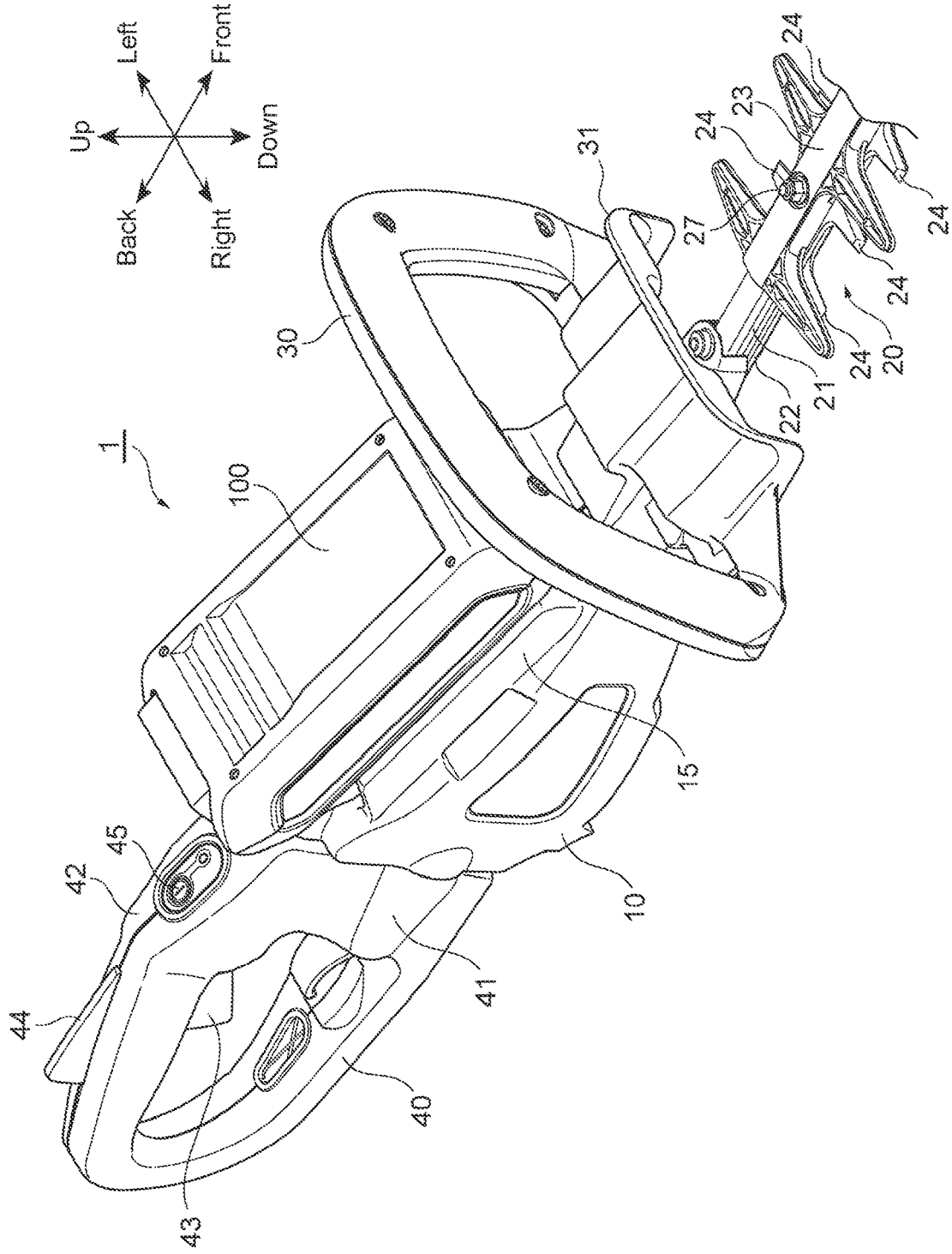
FIG. 1 is a perspective view of a hedge trimmer according to an embodiment of the present invention.

An embodiment of the present invention will be described in detail below by referring to the drawings, as appropriate. A hedge trimmer, which is one type of a trimming machine, will be described below by way of an example. Further, in the present specification, the blade (cutting edge) side is the front side or the leading end side, the body case side is the rear side or the proximal end side, and the side where a front handle held by an operator projects is the upper side and its opposite side is the lower side. However, up-down, front-back, and left-right directions are used for convenience in explaining the hedge trimmer of the present embodiment and do not limit the configuration or use state of the hedge trimmer.

Figure 2:
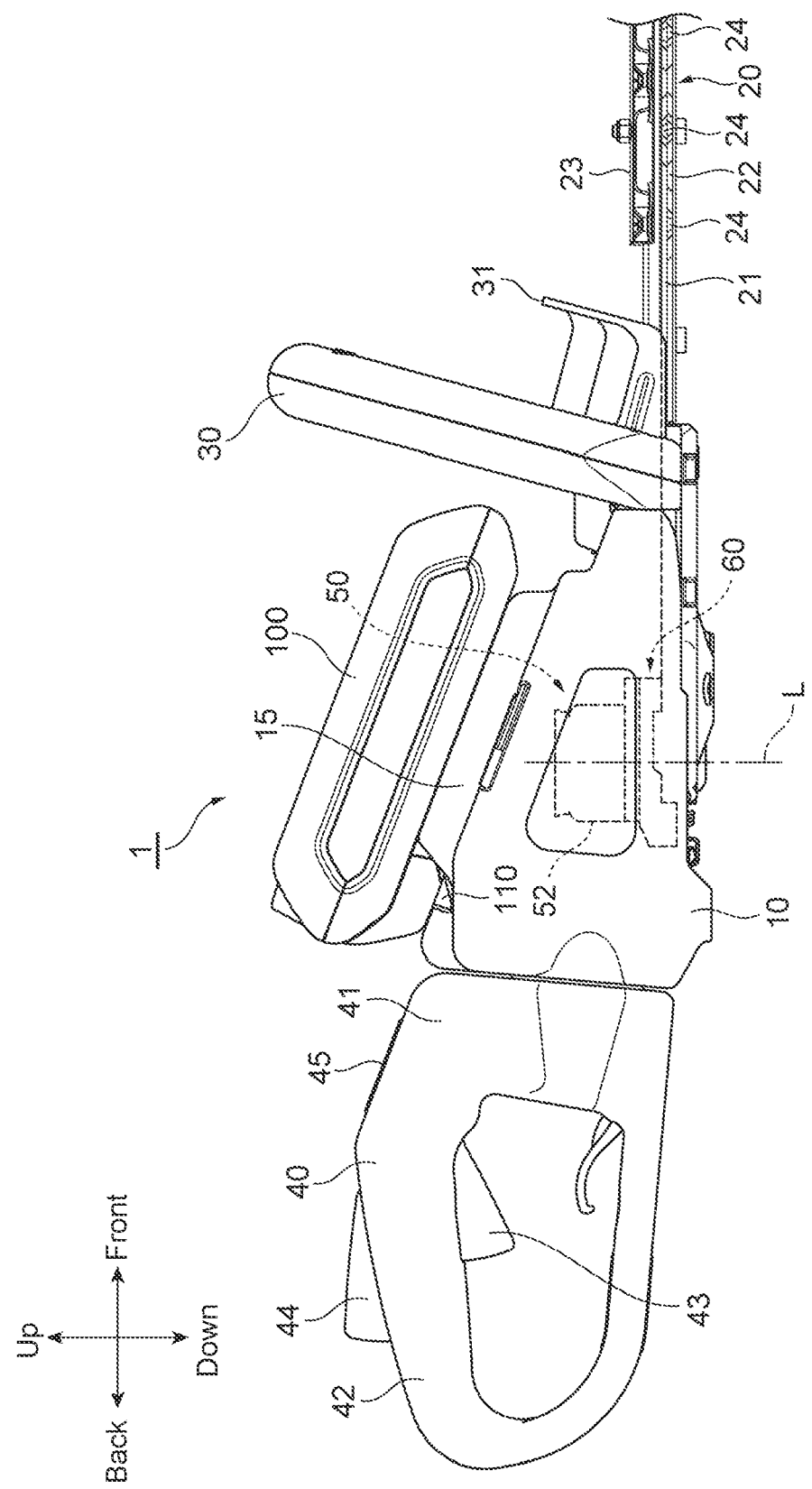
FIG. 2 is a side view of the hedge trimmer according to the embodiment of the present invention.

As shown in FIG. 1, a hedge trimmer 1 of the present embodiment is a hand-held compact cutting working machine used for trimming or cropping hedges or plants, and is electrically driven by a battery 100 mounted thereon. As shown in FIG. 2, the hedge trimmer 1 includes an electric motor 50 as a drive source, a blade assembly 20 disposed forward of the electric motor 50, and a body case 10 that houses the electric motor 50.

The body case 10 is a resin body in a box shape with the upper face inclined relative to the lower face. The upper face of the body case 10 is inclined from the rear side toward the front side. That is, the front portion of the body case 10 is formed lower than the rear portion. Further, the body case 10 is in a substantially triangular shape in a side view.

The upper face of the body case 10 is provided with a battery attachment portion 15 for attaching the battery 100. The battery attachment portion 15 is inclined from the rear portion toward the front portion so as to follow the upper face of the body case 10.

Figure 3:
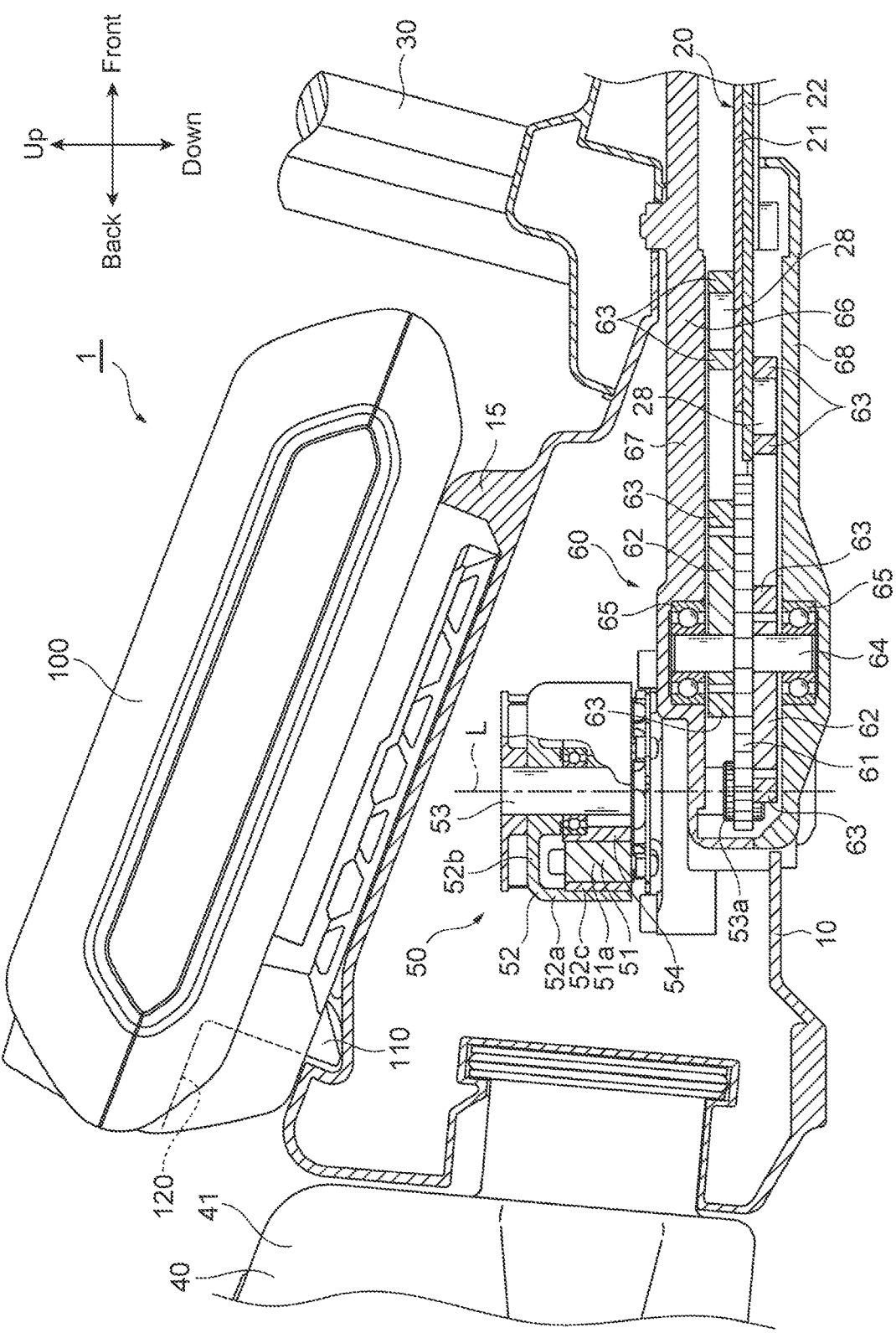
FIG. 3 is a cross-sectional side view of the hedge trimmer according to the embodiment of the present invention.

The battery 100 is a known battery that houses a secondary battery such as a lithium ion storage battery in its cuboid case extending in the front-back direction. An engagement portion 110 that engages with the battery attachment portion 15 projects in the rear end portion on the lower face of the battery 100 as shown in FIG. 2 and FIG. 3.

For attaching the battery 100 to the battery attachment portion 15, while the battery 100 is caused to slide from the rear side toward the front side relative to the battery attachment portion 15, the lower portion of the battery 100 is fitted to the battery attachment portion 15. Then, when the front end portion of the battery 100 reaches a position where it is supported on the front end portion of the battery attachment portion 15, the engagement portion 110 of the battery 100 engages with the battery attachment portion 15, thereby fixing the battery 100 to the battery attachment portion 15.

The upper face of the battery attachment portion 15 is provided with a metal connection terminal (not shown). The connection terminal is electrically connected to a control board (not shown) or the electric motor 50. Further, a connection terminal of the battery 100 is connected to the connection terminal of the battery attachment portion 15, so as to supply power from the battery 100 to the control board or the electric motor 50.

For removing the battery 100 from the battery attachment portion 15, a coupling lever 120 (FIG. 3) provided in the rear end portion of the battery 100 is lifted to disengage the engagement portion 110 from the battery attachment portion 15 so as to allow the battery 100 to be slidable rearward relative to the battery attachment portion 15.

As shown in FIG. 1, a front handle 30 is provided forward of the body case 10. The front handle 30 is disposed forward of the battery 100 attached to the battery attachment portion 15. The front handle 30 is in a gate-like shape as viewed from the front side, and has left and right vertical portions extending downward respectively from the left and right ends of a lateral portion extending in the left-right direction, with the lower ends of both the vertical portions fixed to the front end portion of the body case 10. A front guard 31 is provided between the lower ends of the two vertical portions of the front handle 30. The front guard 31 is formed so as to cover the blade assembly 20 (the proximal end portion thereof) from the upper side.

A rear handle 40 is provided rearward of the body case 10. A coupling portion 41 coupled to the rear portion of the body case 10 and a gripping portion 42 having an opening formed therethrough in the left-right direction are formed in the rear handle 40. To hold the hedge trimmer 1, the operator grips the rear handle 40 by inserting his/her hand into the opening of the gripping portion 42. As shown in FIG. 3, the coupling portion 41 of the rear handle 40 is coupled rotatably about the axis in the front-back direction relative to the rear face of the body case 10, thereby allowing the rear handle 40 in its entirety to be rotatable about the axis in the front-back direction relative to the body case 10.

As shown in FIG. 1, an inner periphery portion of the gripping portion 42 of the rear handle 40 is provided with a trigger lever 43 that is an operation means to rotate the electric motor 50 and thereby drive the blade assembly 20, while the operator grips the handle. Further, the upper face of the gripping portion 42 is provided with a power switch 45 as well as an unlocking lever 44 for unlocking the trigger lever 43.

It should be noted that it is obvious that the shape of the body case 10, the arrangement or attachment structure of the battery 100, and the like are not limited to those in the illustrated examples.

Further, in the hedge trimmer 1 of the present embodiment, power is supplied from the battery 100 to the control board or the electric motor 50, but for example, power may be supplied to the control board or the electric motor 50 from an external power source via a power cord instead of using the battery 100.

As shown in FIG. 2, the blade assembly 20 extends linearly forward relative to the electric motor 50 and projects forward from the front end portion of the body case 10. The blade assembly 20 is a cutting device including an upper blade 21 and a lower blade 22 that are made of metal and a resin cover 23.

The upper blade 21 and the lower blade 22 are an elongated plate-shaped edge tool and are overlaid with one above the other. The upper blade 21 and the lower blade 22 are in an upper and lower pair mutually (relatively) slidably facing and contacting each other. As shown in FIG. 1, a plurality of cutting edges 24 is formed in the upper blade 21 and the lower blade 22 so as to protrude with predetermined gaps therebetween in the left-right direction along the longitudinal direction of the blades. The cover 23 is a protective member to prevent the contact between the operator's hand and the upper blade 21 and the lower blade 22, and covers the upper face of the upper blade 21.

Figure 4:
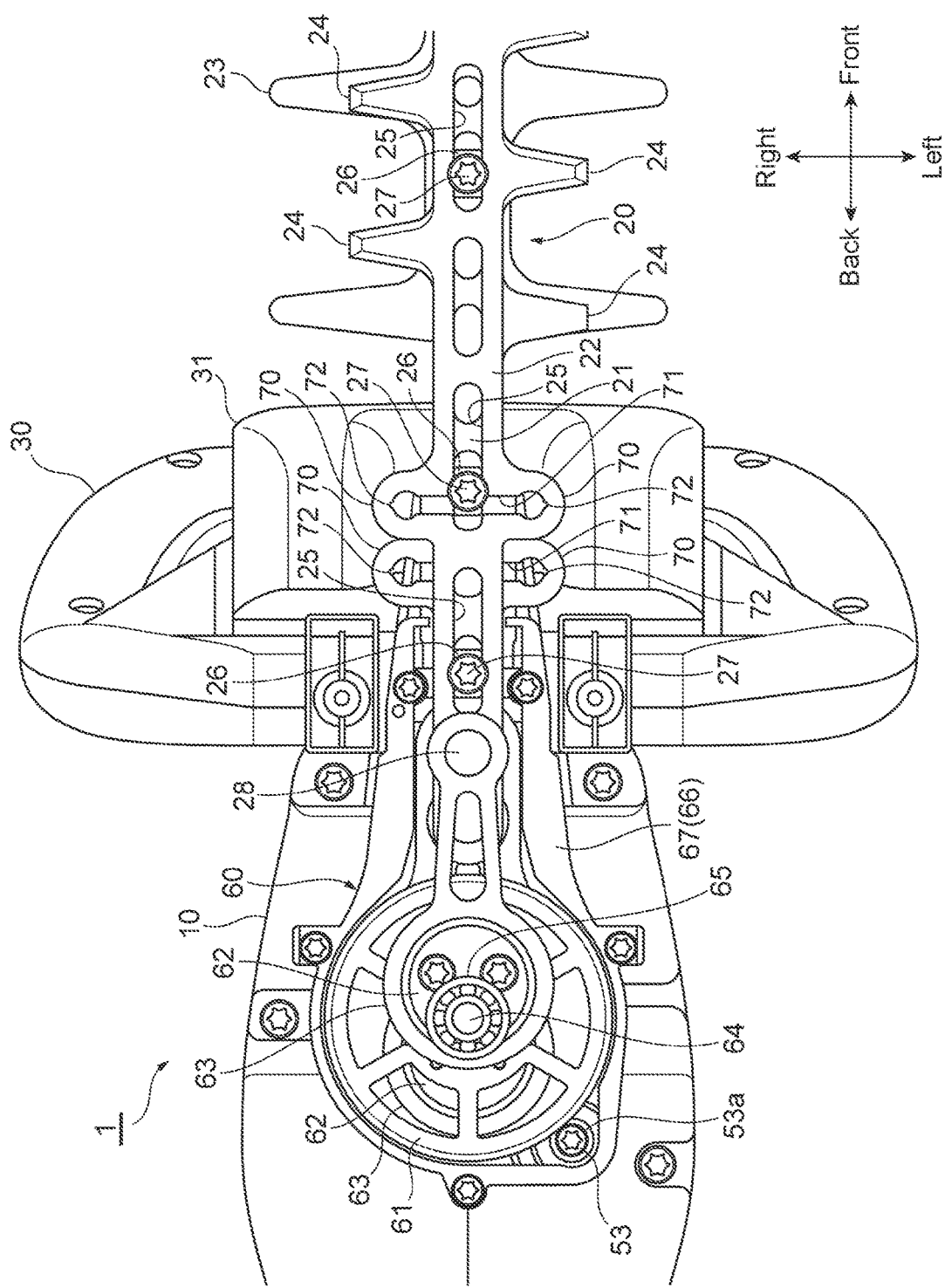
FIG. 4 is a lower face view of the hedge trimmer according to the embodiment of the present invention, in a state in which a bottom plate of a case of a drive transmission mechanism is removed.

As shown in FIG. 4, a required number of elongated apertures (elongated apertures in the longitudinal direction) 25 are formed with predetermined gaps therebetween in the upper blade 21 and the lower blade 22 along the longitudinal direction. The elongated apertures 25 each have a length that allows the reciprocating motion of the upper blade 21 and the lower blade 22. In addition, square cylindrical spacers 26 each having a rectangular insertion round aperture in a plan view are slidably fit-inserted into the elongated apertures 25 (elongated apertures overlaid with one above the other) of the upper blade 21 and the lower blade 22. Bolts 27 as a fastening member are inserted into the insertion round apertures (in some locations in the longitudinal direction, a through-hole provided in the cover 23 may be included) of the square cylindrical spacers 26 for fastening. In this manner, the upper blade 21 and the lower blade 22 are securely fastened at predetermined locations along the longitudinal direction while being mutually (relatively) slidably held.

As shown in FIG. 3 and FIG. 4, a connecting portion 28 that is connected to a movable plate 63, which will be described later, is formed in each of the rear end portions (the proximal end portions) of the upper blade 21 and the lower blade 22. In the present embodiment, the connecting portion 28 is formed as a short cylindrical projection (provided in a protruding manner) and is inserted into an opening of a leading end portion of the movable plate 63 described later so that the upper blade 21 and the lower blade 22 are coupled with the movable plate 63. However, the configuration of the connecting portion 28, that is, the connecting configuration between the upper blade 21 and the lower blade 22 and the movable plate 63 is not limited to the example shown in the drawings. For example, a circular opening as the connecting portion may be formed in each of the upper blade 21 and the lower blade 22 and a cylindrical projection formed in the movable plate 63 may be inserted into the openings for coupling.

The rear end portions of the upper blade 21 and the lower blade 22 are inserted into the body case 10 as shown in FIG. 3 and FIG. 4. The rear end portions of the upper blade 21 and the lower blade 22 are coupled to the electric motor 50 via a drive transmission mechanism 60.

The drive transmission mechanism 60 includes a blade drive gear 61, upper and lower eccentric cams (hereinafter simply referred to as cams) 62, 62 provided in the blade drive gear 61, and upper and lower movable plates (also referred to as connecting rods) 63, 63.

The blade drive gear 61 is a disk-like gear having a support shaft 64 projecting in the up-down direction from the center portion. The upper end portion and the lower end portion of the support shaft 64 are rotationally supported by upper and lower bearings 65, 65 provided in the body case 10. That is, the blade drive gear 61 rotates about the axis of the support shaft 64.

The upper and lower cams 62, 62 formed of eccentric disks project on the upper face and the lower face of the blade drive gear 61, respectively. The upper and lower cams 62, 62 are positioned eccentrically to one side and the other side, respectively, relative to the center of rotation (the center of the support shaft 64) of the blade drive gear 61. In the present embodiment, the upper and lower cams 62, 62 are integrally formed in the gear 61 through shaving.

The cam 62 on the upper side is inserted into an opening of a rear end portion of the movable plate 63 on the upper side for engagement, and the connecting portion 28 in the rear end portion of the upper blade 21 is inserted into the opening in the leading end portion of the movable plate 63 on the upper side for coupling. The cam 62 on the lower side is inserted into the opening of the rear end portion of the movable plate 63 on the lower side for engagement, and the connecting portion 28 in the rear end portion of the lower blade 22 is inserted into the opening in the leading end portion of the movable plate 63 on the lower side for coupling.

Figure 5:
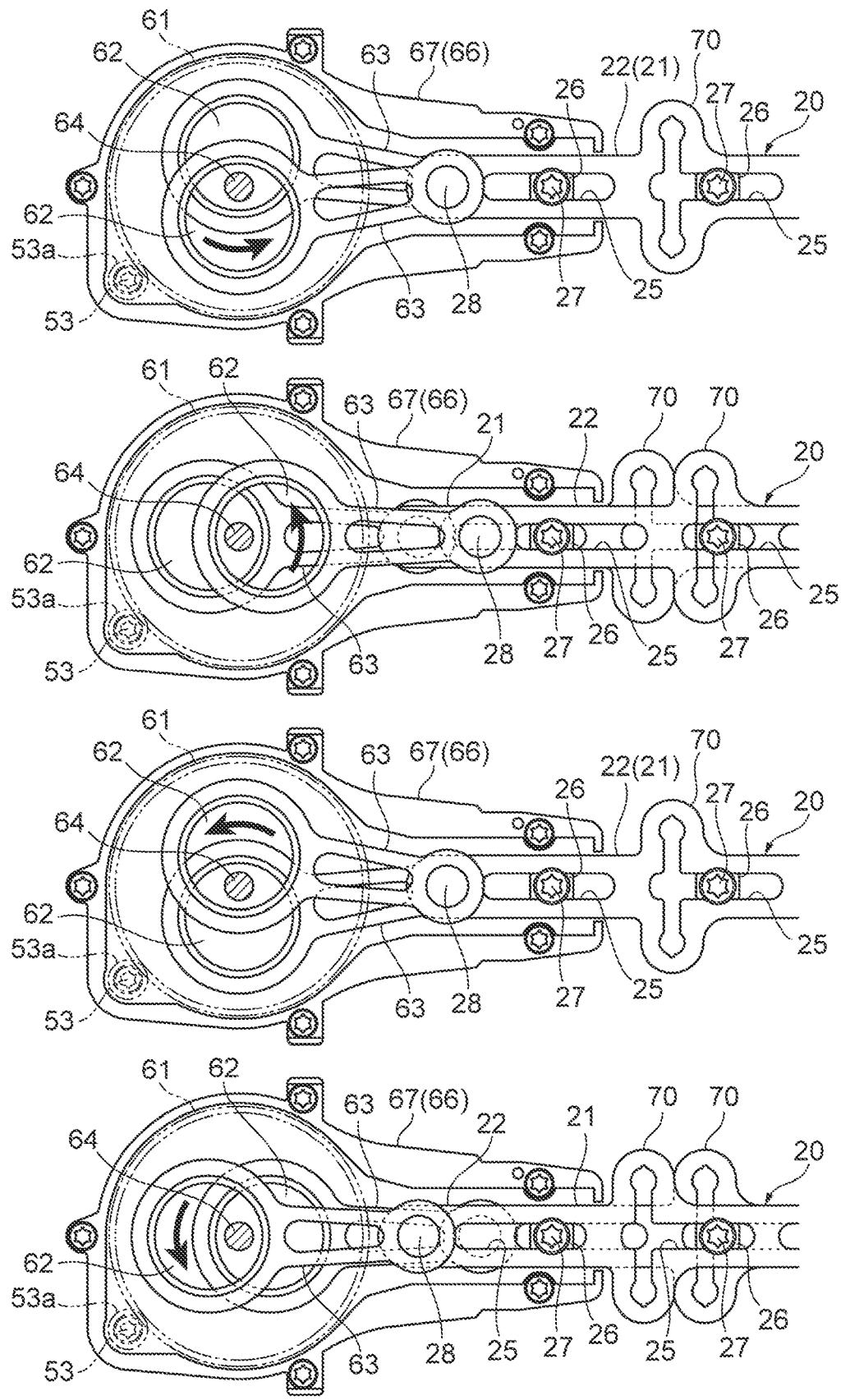
FIG. 5 is a view for explaining the motion of an upper blade and a lower blade engaging with an eccentric cam and a movable plate.

The drive transmission mechanism 60 is configured such that the upper and lower cams 62, 62 rotationally move along with the rotation of the blade drive gear 61, so that the upper and lower movable plates 63, 63 reciprocate in the front-back direction and the upper blade 21 and the lower blade 22 reciprocate oppositely to each other in the front-back direction (in other words, reciprocate with predetermined strokes in mutually opposite directions along the longitudinal direction) (see FIG. 4 and FIG. 5). In other words, the configuration is made such that the rotational motion of the electric motor 50 is converted into the reciprocating motion of the upper blade 21 and the lower blade 22 in the front-back direction (longitudinal direction) via the upper and lower movable plates 63, 63 of the drive transmission mechanism 60.

The aforementioned blade drive gear 61, cams 62, 62, movable plates 63, 63, and the like are housed in a case 66 of the drive transmission mechanism 60. The case 66 includes a top plate 67 and a bottom plate 68. The top plate 67 and the bottom plate 68 of the case 66 are formed so as to cover a rear end portion of the blade assembly 20 as well as the blade drive gear 61, cams 62, 62, movable plates 63, 63, and the like from the upper and lower sides. The blade assembly 20 projects forward from a front end portion of the case 66.

It should be noted that the present embodiment adopts a type of method using a connecting rod in which the upper and lower cams 62, 62 and the upper blade 21 and the lower blade 22 (connecting portions 28, 28 thereof) are indirectly connected via the upper and lower movable plates 63, 63, but it is obvious that for example, a type of method using an elongated aperture may be adopted, in which elongated apertures (elongated apertures in the left-right direction) as the connecting portions are formed in the rear end portions (proximal end portions) of the upper blade 21 and the lower blade 22, and the upper and lower cams 62, 62 are inserted into the elongated apertures (connecting portions) so as to cause the upper blade 21 and the lower blade 22 to reciprocate in the front-back direction, that is, the upper and lower cams 62, 62 and the upper blade 21 and the lower blade 22 (connecting portions thereof) are directly connected.

The electric motor 50 is provided above a rear portion of the drive transmission mechanism 60. The electric motor 50 includes a stator 51, an outer rotor 52, an output shaft 53, and a base member 54.

The stator 51 is provided with a plurality of coils 51*a*. A lower end portion of the base member 54 provided on an inner periphery of the stator 51 is fixed to the case 66 (top plate 67 thereof) of the drive transmission mechanism 60.

The output shaft 53 is inserted into a bearing provided on an inner periphery surface of the base member 54. In this manner, the output shaft 53 is rotationally supported on the base member 54. A lower end portion of the output shaft 53 is provided with an output gear 53*a*. The output gear 53*a* meshes with the blade drive gear 61 of the drive transmission mechanism 60.

In the outer rotor 52, a cylindrical peripheral wall portion 52*a* surrounding the outer periphery of the stator 51 and each coil 51*a*, and a top portion 52*b* closing an upper face opening of the peripheral wall portion 52*a* are formed. The outer rotor 52 of the present embodiment is made of iron, but the material of the outer rotor as a wheel is not limited. A plurality of magnets 52*c* is attached on an inner periphery surface of the peripheral wall portion 52*a*.

An upper end portion of the output shaft 53 is coupled to the center portion of the top portion 52*b* of the outer rotor 52. In this manner, the outer rotor 52 is rotationally supported on the stator 51, so that the output shaft 53 and the outer rotor 52 rotate in association with each other. A rotating axis L of the outer rotor 52 and the output shaft 53 extends in the up-down direction orthogonal to the extending direction (front-back direction) of the blade assembly 20.

The outer rotor 52 has a diameter (in the lateral direction) greater than the length in the rotating axis L direction (in the up-down direction). That is, when the outer rotor 52 is viewed from the lateral direction (the direction orthogonal to the rotating axis L), it is in a flat shape with the lateral width greater than the height.

The outer rotor 52 is rotationally supported on the stator 51 and is coupled to the rear end portion of the blade assembly 20 via the drive transmission mechanism 60. Further, when power is supplied from the battery 100 to each coil 51*a* of the stator 51, the outer rotor 52 and the output shaft 53 rotate and the drive force is transmitted to the blade assembly 20 via the drive transmission mechanism 60, so that the upper blade 21 and the lower blade 22 reciprocate oppositely to each other in the front-back direction (see FIG. 4 and FIG. 5). That is, the cams 62, 62 of the drive transmission mechanism 60 cause the upper and lower pair of elongated upper blade 21 and lower blade 22 to reciprocate in mutually (relatively) opposite directions along the longitudinal direction of the blades, thereby grinding the cutting edges 24 in a comb-like tooth shape, which are provided in the blades, against each other, so as to perform trimming or cropping of hedges or plants.

In the hedge trimmer 1 electrically driven by the electric motor 50 with the aforementioned configuration as a drive source, when locking occurs while performing trimming or cropping without adopting the clutch mechanism, the rotating force of the motor 50 or the shock (large torque) at the time of locking cannot be released by means of the clutch mechanism, which could damage (tooth lacking or the like) the gear 61 due to the direct transmission of the shock at the time of locking or the like.

Thus, in the present embodiment, in order to suppress the damage to the gear 61 when the blades (upper blade 21, lower blade 22) are locked, a shock absorbing portion 70 is provided between the connecting portion 28 and the cutting edges 24 (specifically, the cutting edges 24 positioned on the most proximal end side or the connecting portion 28 side) in the blade (upper blade 21, lower blade 22).

It should be noted that the shock absorbing portion 70 may be provided in both or one of the upper blade 21 and the lower blade 22. The details will be described below by way of an example in which the shock absorbing portion 70 is provided in the lower blade 22.

Figure 6:
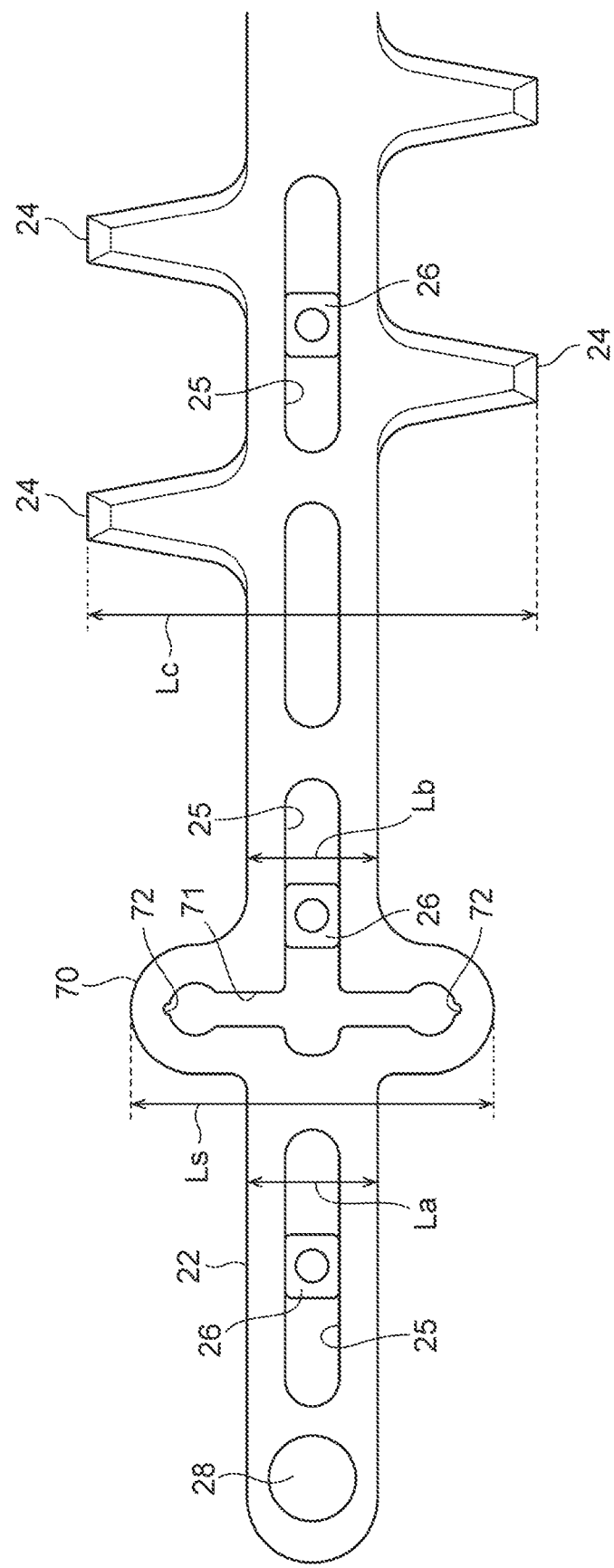
FIG. 6 is an enlarged lower face view of a main part (proximal end portion) of the lower blade of the hedge trimmer according to the embodiment of the present invention.

The shock absorbing portion 70 is the most fragile portion on the lower blade 22 and is adapted to suppress (absorb) the shock at the time of locking or the like that is transmitted to the gear 61 via the movable plate 63 or the like, by being deformed or broken, when locking occurs. As is clear by referring to FIG. 4 and FIG. 6, in the present embodiment, the shock absorbing portion 70 includes a slit portion 71 and a fragile portion 72.

The slit portion 71 is formed so as to extend in the left-right direction (the orthogonal direction relative to the reciprocating direction). Further, the ends in the left-right direction of the slit portion 71 are each formed in substantially circular with the width slightly wider than that of the middle section (wider in the front-back direction). In the present embodiment, the width (Ls) in the left-right direction of the shock absorbing portion 70 including the slit portion 71 is wider than the width in the left-right direction of the lower blade 22. That is, the width (Ls) in the left-right direction of the shock absorbing portion 70 including the slit portion 71 is wider than the width (La) in the left-right direction of the lower blade 22 between the connecting portion 28 and the shock absorbing portion 70 and/or the width (Lb) in the left-right direction of the lower blade 22 between the shock absorbing portion 70 and the cutting edges 24. Furthermore, the width (Ls) in the left-right direction of the shock absorbing portion 70 including the slit portion 71 is narrower than the width (Lc) in the left-right direction of the cutting edges 24 provided in a protruding manner in the left-right direction in the lower blade 22. In other words, the shock absorbing portion 70 including the slit portion 71 is formed such that it is positioned on the inner side in the left-right direction as compared to the cutting edges 24 provided in a protruding manner in the lower blade 22 so as not to project to the outer side in the left-right direction as compared to the cutting edges 24 provided in a protruding manner in the lower blade 22.

The fragile portion 72 includes a notch, a cutout, a recess, a groove, or the like. In the present embodiment, the fragile portion 72 is formed at each end in the left-right direction of the slit portion 71 (in other words, portions of the slit portion 71 that are most distanced from the center of the lower blade 22).

With such a configuration, when locking occurs while performing trimming or cropping, the shock absorbing portion 70 is deformed due to the shock at the time of locking or the like. Further, when the shock at the time of locking or the like cannot be absorbed only by deforming the shock absorbing portion 70 (slit portion 71 thereof), the fragile portion 72 (notch or the like) provided in the shock absorbing portion 70 is broken. Thus, the shock at the time of locking or the like that is transmitted to the gear 61 via the movable plate 63 or the like can be suppressed (absorbed) by the shock absorbing portion 70 being deformed or broken.

Further, in the present embodiment, in relation to the space for installation, the slit portion 71 of the shock absorbing portion 70 is formed so as to extend in the left-right direction from the elongated aperture 25 into which the aforementioned square cylindrical spacer 26 is inserted. However, the slit portion 71 of the shock absorbing portion 70 may be formed so as to extend in the left-right direction from a position different from the elongated aperture 25 into which the aforementioned square cylindrical spacer 26 is inserted. For example, in the latter case, supposing that at the time of locking, the tension force in the front-back direction is exerted so as to deform the shock absorbing portion 70 (slit portion 71 thereof), the elongated aperture 25 adjacent to the shock absorbing portion 70 (slit portion 71 thereof) is deformed to be widened in the left-right direction, thereby obtaining the effect of allowing the upper blade 21 and the lower blade 22 to be smoothly mutually (relatively) slidable (in other words, the sliding motion of the upper blade 21 and the lower blade 22 is not obstructed).

Furthermore, in the present embodiment, the shock absorbing portion 70 is provided in one location between the connecting portion 28 and the cutting edges 24 in the blade (upper blade 21, lower blade 22). However, it is obvious that the shock absorbing portions 70 may be provided in a plurality of locations between the connecting portion 28 and the cutting edges 24 in the blade (upper blade 21, lower blade 22). In addition, it is evident that the shape of the shock absorbing portion 70 is not limited to those shown in the drawings.

As described above, the hedge trimmer 1 of the present embodiment includes the electric motor 50, the blade drive gear 61 rotationally driven by the electric motor 50, the eccentric cam 62 provided in the gear 61, and the pair of blades relatively slidably facing and contacting each other, in which the eccentric cam 62 reciprocates the pair of blades in relatively opposite directions along the longitudinal direction of the blades, thereby grinding the cutting edges 24, which are provided in a protruding manner with gaps therebetween in the pair of blades, against each other. Further, the shock absorbing portion 70 is provided between the connecting portion 28 connected to the eccentric cam 62 (in the present embodiment, the connecting portion 28 connected to the movable plate that connects the cam and the blade) and the cutting edges 24 (exactly, the cutting edges 24 positioned on the most proximal end side or the connecting portion 28 side) in the blade. In this manner, the shock absorbing portion 70 is deformed to enable to release the shock or the like generated when the cutting edges are caught in a solid material made of a wide branch, a fence, steel or the like while performing trimming or cropping, causing the blades to be locked (at the time of locking), so that the damage to the gear 61 can be suppressed.

Further, the shock absorbing portion 70 includes the fragile portion 72 (such as a notch). Thus, even when the shock or the like that is too large to be absorbed by the shock absorbing portion 70 is exerted, the fragile portion 72 (such as a notch) is broken so that the damage to the gear 61 can be suppressed. Furthermore, since the fragile portion 72 is provided between the connecting portion and the cutting edges, portions of the cutting edges 24 do not break, so that the safety is more secured.

It should be noted that since the blades are parts that are typically exchangeable when worn out, even when they are deformed or broken as described above and are thus exchanged, the exchange is easy and the cost can be kept low as compared to the case of exchange due to the damage to the gear 61 or the like (that is, a significant cost advantage is obtained).

Moreover, the shock absorbing portion 70 includes the slit portion 71 extending in the orthogonal direction (lateral direction) relative to the reciprocating direction (longitudinal direction) of the blades. The width in the orthogonal direction of the shock absorbing portion 70 including the slit portion 71 is wider than the width in the orthogonal direction of each of the blades between the connecting portion 28 and the shock absorbing portion 70 and/or the width in the orthogonal direction of each of the blades between the shock absorbing portion 70 and the cutting edges 24. In this manner, the maintainability is improved, for example, removal of the shavings adhering between the upper blade 21 and the lower blade 22 is facilitated by allowing the user to grip the shock absorbing portion 70 to forcibly slide the blades.

In addition, the width in the orthogonal direction of the shock absorbing portion 70 including the slit portion 71 is narrower than the width in the left-right direction of the cutting edges 24 that are provided in a protruding manner in the left-right direction. With this, the shock absorbing portion 70 is less likely to be caught in branches or the like during operation, so that the operability can be maintained.

As described above, according to the present embodiment, the shock absorbing portion 70 only needs to be provided between the connecting portion and the cutting edges in the blade, and thus, the weight and cost do not increase, and the damage to the gear 61 when the blades are locked can be suppressed with a simple structure.

The example of the present embodiment of the present invention has been described, but the present invention is not limited to the aforementioned embodiment, and can be appropriately changed in the scope without departing the spirit of the present invention.

The blade assembly 20 of the hedge trimmer 1 of the present embodiment extends linearly forward as shown in FIG. 1, and is configured such that the upper blade 21 and the lower blade 22 reciprocate in the front-back direction. However, the configuration of the blade assembly is not limited thereto. For example, as an example of the blade assembly, the configuration with the blades in a T-shape may be adopted, in which the blades extending in the left-right direction are provided in the leading end portion of the linear portion extending forward from the electric motor 50 so as to be reciprocated in the left-right direction. Further, the blade assembly 20 of the hedge trimmer 1 of the present embodiment is of a type in which the upper and lower eccentric cams 62, 62 reciprocate the upper blade 21 and the lower blade 22 in relatively opposite directions along the longitudinal direction of the blades, thereby performing trimming or cropping (that is, the upper blade 21 and the lower blade 22 both move), but it is obvious that the blade assembly 20 may be of a type in which one of the upper blade 21 and the lower blade 22 does not move.

What is claimed is:

1. A trimming machine comprising:
   an electric motor;
   a blade drive gear rotationally driven by the electric motor;
   a pair of blades formed to extend in a longitudinal direction and in slidable contact with each other, wherein the pair of blades each being formed with a connecting end and with cutting edges extensive in a transverse direction from longitudinal sides of the pair of blades at longitudinal intervals;
   an eccentric cam operably connected to the blade drive gear and to the connecting ends of the pair of blades to transform rotation movement of the blade drive gear into reciprocal longitudinal movements of the pair of blades in relatively opposite directions, wherein the reciprocal movements of the pair of blades cause the cutting edges to reciprocally grind against each other; and
   a shock absorbing portion provided for each of the pair of blades between the connecting end and the cutting edges thereof, the shock absorbing portion being formed with a pair of fins extending oppositely from the longitudinal sides of the blade in transverse alignment with each other and formed with a hole transversely elongated to cut transversely through the blade into the fins, wherein the shock absorbing portion constitutes a portion of the blade that is most fragile along the longitudinal length of the blade such that the transversely elongated hole is compressed to deform in the longitudinal direction to absorb an impact caused by locking of the pair of blades.

2. The trimming machine according to claim 1, further comprising a connecting rod that connects the eccentric cam and the connecting end of each of the pair of blades.

3. The trimming machine according to claim 1, wherein the pair of fins extend shorter transversely than the cutting edges.

4. The trimming machine according to claim 1, wherein the transversely elongated is formed with at least one of a notch, a cutout, a recess, or a groove.

5. The trimming machine according to claim 1, wherein the pair of blades is each formed with a longitudinally elongated hole therein for a member to be inserted to retain the pair of blades together for reciprocal movements relatively in the opposite directions, and the transversely elongated hole of the shock absorbing portion is formed to cut transversely through the longitudinally elongated hole.

6. The trimming machine according to claim 1, wherein the pair of blades is each formed with a longitudinally elongated hole therein for a member to be inserted to retain the pair of blades together for reciprocal movements relatively in the opposite directions, and the transversely elongated hole of the shock absorbing portion is formed in a location of the blade to avoid cutting through the longitudinally elongated hole.

\* \* \* \* \*